H. T. HAZARD.
MECHANISM FOR STEERING AUTOMOBILES.
APPLICATION FILED JAN. 14, 1914.
1,111,693.
Patented Sept. 22, 1914.
2 SHEETS—SHEET 1.
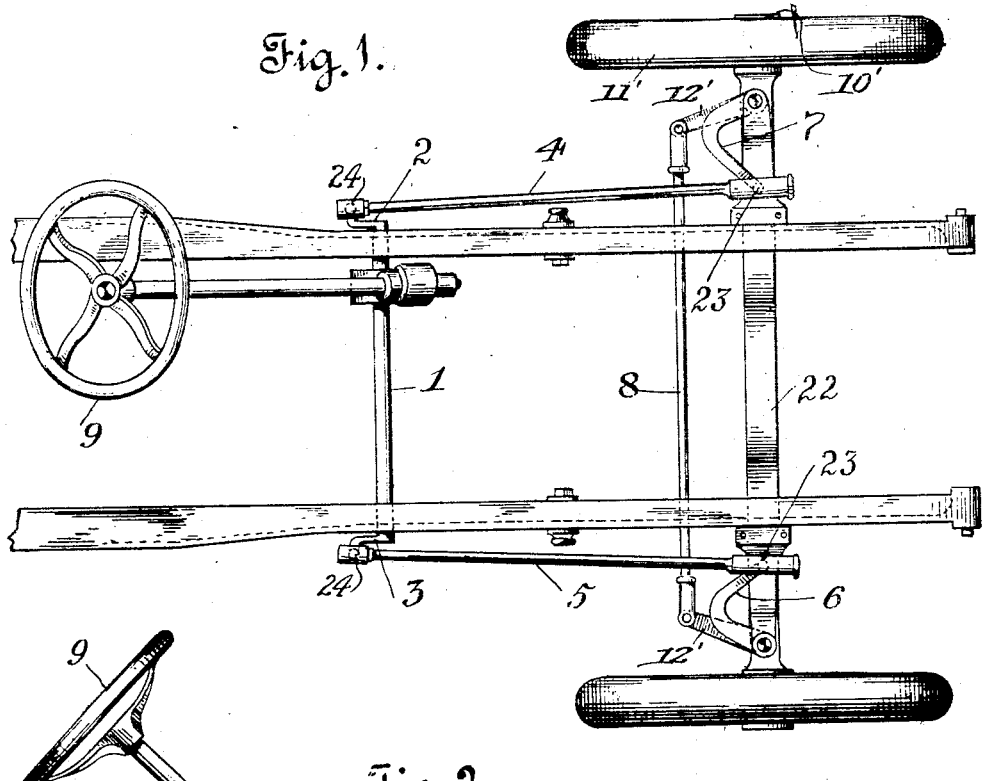
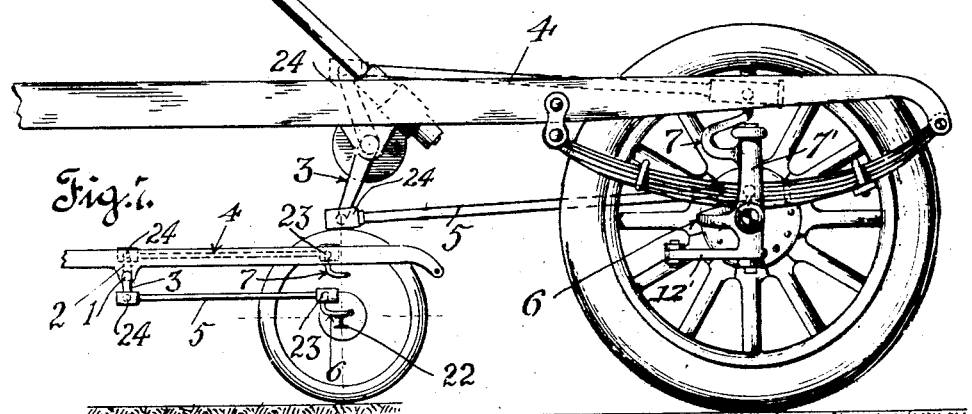
Witnesses,
J. Monteverde
Marie Battey
Inventor,
by Henry T. Hazard
Hazard & Strauss
Attys.

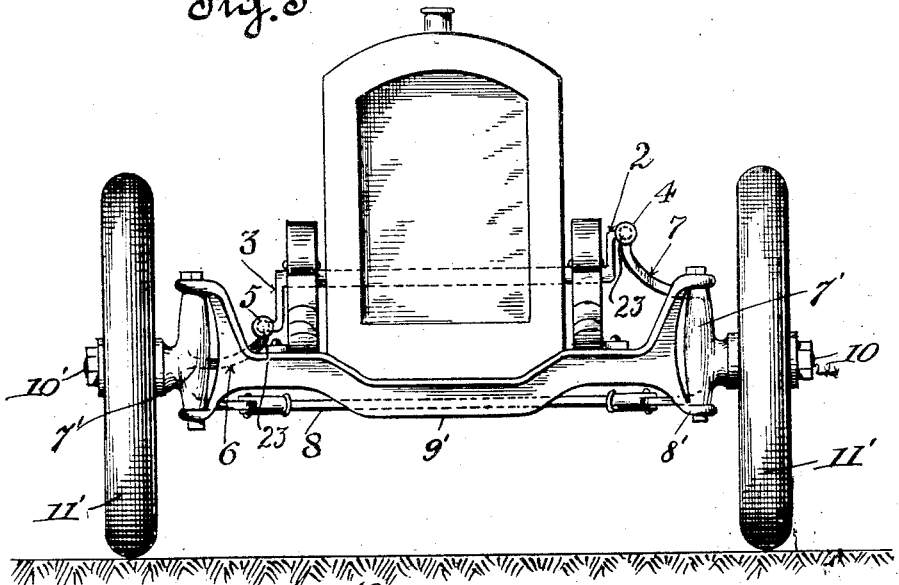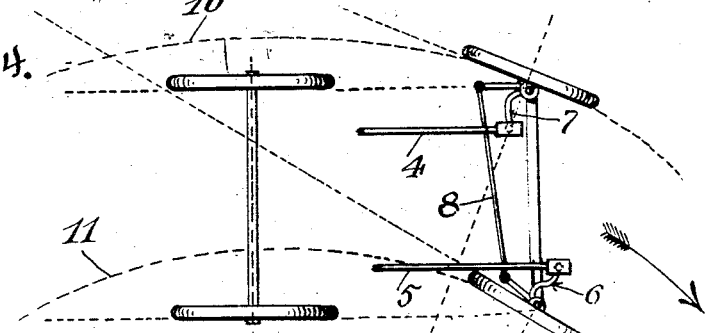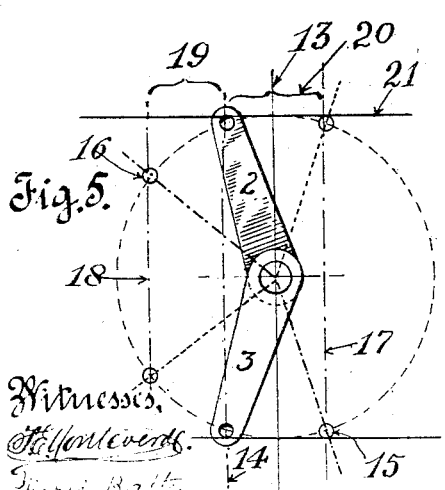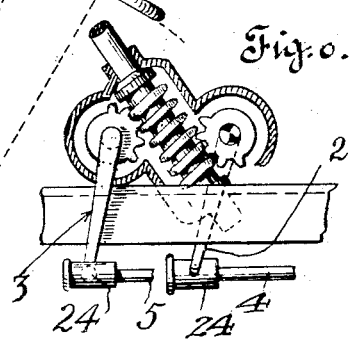

UNITED STATES PATENT OFFICE.

HENRY T. HAZARD, OF LOS ANGELES, CALIFORNIA.

MECHANISM FOR STEERING AUTOMOBILES.

1,111,693.   Specification of Letters Patent.   Patented Sept. 22, 1914.

Application filed January 14, 1914. Serial No. 812,005.

*To all whom it may concern:*

Be it known that I, HENRY THOMAS HAZARD, a citizen of the United States, residing at Los Angeles, in the county of Los Angeles, State of California, have invented new and useful Improvements in Mechanism for Steering Automobiles, of which the following is a specification.

The object of my invention is to provide a steering mechanism to give additional safety to the operation of motor cars, and to that end I provide two separate steering devices so that in case of breakage of any part of either of the steering mechanisms the other will perform the services necessary to prevent the driver of the car from losing control thereof. I accomplish this object by means of the device described herein and shown in the accompanying drawings, in which:

Figure 1 is a plan of my steering device, together with so much of the frame and running gear as will illustrate the invention with other parts of the mechanism. Fig. 2 is a side elevation of the parts shown in Fig. 1. Fig. 3 is a front elevation with the radiator in place. Fig. 4 is a diagram showing the position of the front and rear wheels and drag link when making a turn to the right. Fig. 5 is a diagrammatic view showing the position of the steering cranks mounted on the rotary steering shaft. Fig. 6 shows a modification whereby the two steering links may be disposed on the frame at the same horizontal plane. Fig. 7 is a fragmentary view showing a modification.

In the operation of a motor car excessive strain is thrown upon the steering mechanism, especially when the automobile is moving at a rapid rate over a rough road, and this continued and oft repeated strain thrown on the steering parts often causes them to break. This will cause the operator to lose control of the car, either capsizing the car or running it off the road into gulches or against posts, or other obstructions. To lessen the liability of these accidents and to render the use of automobiles less dangerous, I have provided duplicate steering mechanism.

In the various drawings, 1 represents the rotary steering shaft upon which are mounted steering cranks 2 and 3, crank 2 being keyed on the left end of the steering shaft, and crank 3 keyed on the right end thereof.

The steering shaft is operatively connected in the usual manner by means of worm and segmental gearing to the steering column. The rotation of the steering column will produce a rotary motion of the steering shaft 1. Extending forwardly from the steering cranks are the steering links 4 and 5 pivotally connected with the swinging end of the steering arms 6 and 7; the usual drag link or tie rod 8 being connected as shown. The steering arms 6 and 7 are rigidly connected with vertical knuckles 7′, pivoted within the forked ends 8′ of the front axle 9′, as shown. The steering arms are preferably arranged on a horizontal plane to neutralize as far as possible the forward and backward stroke of the front ends of these arms as will be hereinafter more fully explained. The knuckles 7′ carry stub-axles 10′, upon which are mounted the front or steering wheels 11′, as shown. Rigidly connected with the knuckles 7′, preferably near their lower ends are drag-link arms 12′, to which are pivoted a drag link 8, as shown.

The cranks or arms 2 and 3 are arranged in the construction shown in the drawings, the crank 3 being inclined downwardly and rearwardly from the center of the steering shaft 1, and the crank 2 being inclined rearwardly and upwardly. By this arrangement each crank 2 and 3 when swinging from its normal position forwardly passes from a point upon one side of its pivot to a point upon the opposite side thereof, but when swinging rearwardly from the normal starting position, moves wholly upon the same side of the pivot. Upon the rotation to the right of the steering wheel 9 the steering link 5 will move forwardly, and the link 4 to the left will move rearwardly, causing the car to turn to the right. The position of the steering links 4 and 5, when at their extreme stroke in turning to the right, is shown in Fig. 4, which shows also the position of the drag link 8 in which the left end is farther from the front axle than the end to the right. The two front wheels will travel in two concentric circles 10 and 11, Fig. 4, being the necessary position of the front wheels in making a turn to the right; the spindles in the wheels pointing in the direction of the center 12 of the circle.

In making the turn to the right, as shown in Fig. 4, the steering link 4 will move rearwardly over the shorter stroke, throwing the left fore-wheel to the right at a less angle than the right fore-wheel; the steering link 5 is moved forwardly through the greater stroke throwing the right hand wheel into a greater angle than the left hand wheel. In other words, for a given movement of the hand-wheel the spindles move through unequal angles. Upon the movement to the left of the steering wheel the reverse operation will take place and the stroke of the links will be in a direction reverse to that shown in Fig. 4. The difference in the strokes of these two steering links is more particularly explained in Fig. 5, which shows the position of the cranks 2 and 3 which are secured to the opposite ends of the steering shaft 1, looking at them from the right side of the car.

In Fig. 5 the position of the steering cranks, when the car is in the straight ahead or normal position, is shown. These cranks point rearwardly from the central vertical line 13 and the swinging ends thereof will rest on the vertical line 14. Upon turning the wheel to the right the swinging end of the crank 3 will move forwardly to the point marked 15 on the vertical dotted line 17, and the crank 2 will move rearwardly to the point marked 16 on the vertical dotted line 18, and the distance between the lines 18 and 14 will show the rearward stroke of the crank 2. This distance is indicated by the bracket 19, and the distance from 14 to 17 will show the movement forward of the crank 3, and is indicated by the bracket 20. The difference between these points as shown on the horizontal line 21 will give the difference between the forward stroke and the rearward stroke of these cranks producing the difference in the direction of the two front wheels, both of which move on an arc of two concentric circles having their focus point at the point indicated by 12 in Fig. 4. The inclination toward each other of the drag-link arms 12', will indicate the angle from the perpendicular to give the cranks 2 and 3. These elements or parts in a steering device are subjected to continuous strains, especially in passing over rough roads rapidly, and after a time one or the other thereof may become crystallized and breaks, often with serious results, especially if the car is passing another car, or on a side hill, bridge or grade, or in juxtaposition to a telegraph pole or other obstacles in the road. These parts are usually of sufficient strength to resist these strains under ordinary conditions, but it has been found by experience that in localizing the strains on these various parts they often crystallize and give way, different parts at different times, but it is very unlikely that two of the same parts would break or give way at the same time, practically eliminating any danger thereof. It will be seen by this arrangement that the drag link 8 can be broken or dispensed with and the steering mechanism remain complete; also either the steering link 4 or 5 can be broken or dispensed with and the steering mechanism remain complete. Likewise either of the steering arms 6 or 7 may be broken or dispensed with and the steering mechanism remain complete, rendering it very unlikely to disarrange the steering mechanism of an automobile equipped with my duplex steering device, whereas in motor cars having the usual steering mechanism the breakage of any one of these parts will cause the driver to lose control of the car.

It will be seen in Figs. 2 and 3 that the steering links are disposed one on a higher plane than the other. This results from having but one steering shaft on which both the cranks 2 and 3 are keyed, and the purpose in thus placing them is that one will move forwardly while the other will move rearwardly, and vice versa, on a reversal of the steering wheel. In order that these steering links may be mounted on the same level in line with the frame of the car, if desired, I have shown in Fig. 6, a fragmentary view of the worm gear operating two steering shafts, one disposed in front of the steering column and the other to the rear thereof. This will give a reverse direction to the swinging ends of these steering cranks on the rotation of the steering wheel, both being mounted on the same horizontal plane.

In Fig. 7 I have shown a modification whereby the steering knuckles 23 on the steering arms 6 and 7 may be disposed in a position in the rear of a vertical line which bisects the front axle and steering knuckle 24 on the steering crank 3 in a vertical line below the center of the shaft 1, and the steering knuckle 24 on the swinging end of the crank 2 in a position directly above the center of the rotary steering shaft 1. When the steering mechanism is mounted in this manner it will produce a like result as if the swinging ends of the steering cranks were disposed rearwardly from the center line drawn through the rotary steering shaft, and the steering knuckles disposed immediately above the center of the axle, as shown in Figs. 1, 2 and 4.

The position of the various parts is shown while the car is in its normal position, (except on Fig. 4) that is, when the car is moving in a straight line forwardly, or at rest with the forward wheels in the position which they assume in moving in a direct line forwardly. In Fig. 4 it is shown turning to the right, and it will be understood that the various descriptions and claims herein contained refer to the car in its normal position, that is, the parts are shown and described in the position they assume when the car is moving directly forward, unless otherwise stated.

The position of the swinging ends of the steering arms with regard to the vertical plane extending from the center of one spindle to the center of the other will indicate the angle rearwardly to give the steering cranks to meet the varying stroke of the steering arms, the movement of which is controlled by the action of the drag link, that is to say if these swinging ends are disposed in the vertical plane above mentioned then the steering cranks must be inclined rearwardly to meet this varying stroke, if the swinging ends are disposed rearwardly of this plane to such an extent as to make up the difference in the stroke, then the cranks must be placed vertically. This difference can be obtained by the placement of the swinging ends of the steering arms in the rear of the vertical plane or the steering arms can be inclined rearwardly, or this difference of stroke can be obtained partly in the placement of the steering arm and partly in the placement of the steering cranks. Always that difference must be made up either in one or both—to illustrate, if the swinging ends of the steering arms are placed to the rear one-fourth of the amount required then the steering cranks must be placed to the rear so as to make up the other three-fourths.

The incessant wabbling of the front wheels in passing over uneven surfaces in the road—in cars equipped with the single type of steering gear—is caused not by the uneven surfaces, but by reason of the fact that the body to which the rear end of the steering link is secured moves rapidly up and down, while the front axle to which the front end of the steering link is secured follows practically the contour of the road, causing the body and the axle to move rapidly toward and away from each other, and the front end of the steering link to move forward and back, moving the wheels to the right or the left, with the same effect as if the car is turning, which can be illustrated by jacking up the car in order to clear the floor and moving the rear of the body up and down the same as it is required the hand steering wheel is prevented from turning the wheels of the car in the same manner which they do while the car is passing over uneven surfaces in the road. This incessant turning of the steering wheels from one side to the other causes a swaying motion of the car, rendering it often difficult for the driver to keep the car in the road. At such times it becomes necessary to slow down or have an accident, and the great number of accidents shows how often they fail to slow down. This wabbling is prevented in a car equipped with my improvement as follows:—Having two steering links, each one reaching from the front wheel to the steering crank, when the body of the car is caused to approach the front axle, the forward ends of the two steering links will move forward or backward together. This simultaneous movement of both links in the same direction will have the effect to neutralize any action caused thereby and to hold both wheels in proper forward alinement, because the drag link will not permit one wheel to turn in one direction and the other in another direction. Now a forward stroke of both the steering links would, in the absence of the drag link, cause the right wheel to turn to the right and the left wheel to the left, which the drag link will prevent, the result being that the direction of neither wheel is affected. The usual coiled or helical spring in the forward end of the steering link will compensate for the difference in length required to adapt the steering links to the different positions they assume when the car is being operated. Another advantage consists in the fact that the hand-steering wheel is prevented from the incessant wabbling which occurs with the single steering device, and the liability of the wheel being jerked out of the hands of the driver is also prevented. The hand-steering wheel will always have a jerking motion when the front wheels wabble. These advantages are secured by the duplex steering device, in addition to the safety afforded in the case of the breakage of any of the parts of the steering mechanism.

The drag link or tie rod may be disposed in front instead of in the rear of the fore axle, where it will perform the same function, in which case, however, the same inclination of the drag-link-supporting arms will be away from instead of toward each other.

In this mechanism the relation of the parts is such that if any link connecting two moving arms were removed, the arms would still move just as though the link had not been removed. In other words the distance between the swinging ends of two such arms remains constant for all the different positions the steering mechanism may assume.

What I claim is:

1. In a steering mechanism of the character herein described, a pair of spindles, wheels on said spindles, a steering arm and a drag-link supporting arm on each spindle, a drag-link carried by said drag-link supporting arms, steering cranks, rigid unbendable steering links operatively connecting the swinging end of the steering arms with the swinging end of the steering cranks, said steering cranks arranged to swing on a vertical plane and maintain a constant distance between the swinging ends of the steering arms and the swinging ends of the steering cranks.

2. In a steering mechanism of the character herein described, a pair of spindles, a steering arm on each spindle, a drag-link supporting arm on each spindle, a drag-link connecting said last mentioned arms adapted to give the spindles the proper position in turning, a hand steering wheel, steering cranks operatively mounted on the frame to move in a vertical plane, one in a forward and one in a rearward direction on the rotation of the hand steering wheel, means connecting the steering cranks with the hand steering wheel, and rigid unbendable steering links extending from the swinging ends of the steering arms to the swinging ends of the steering cranks, the cranks and arms arranged to give a free movement to the steering links while turning in either direction.

3. A duplex steering device, comprising a steering column carrying on its lower end a worm gear, a shaft transversely mounted and carrying segmental gearing meshing with the worm gear, said shaft carrying a pair of steering cranks, one crank extending upwardly and one downwardly, both of said cranks being inclined rearwardly from a vertical plane through the axis of the steering shaft, and links connecting the steering arm on each side with the corresponding cranks.

4. In an auto car provided with the usual steering device, comprising a steering arm mounted on the stub axle of one of the fore-wheels, the usual drag-link supporting arms inclined toward or away from each other, usual drag-link supported thereby, the usual steering link extending from said steering arm to the usual steering crank keyed on the steering shaft, the herein described supplementary steering mechanism adapted to act in concert with the herein-before mentioned device or independently thereof comprising an extension on the steering shaft, a supplemental steering crank on the extension, both steering cranks having an inclination rearwardly equal to the inclination toward or away from each other of the drag link supporting arms, a supplementary steering arm on the stub axle of the other fore wheel and a supplementary steering link operatively connecting the swinging end of the supplementary steering crank with the supplemental steering arm.

5. A duplex steering device comprising a pair of steering arms one on the spindle of each front wheel, a steering shaft, steering cranks keyed thereon, steering links operatively connected at their forward end to the steering arms, and at their rear ends to the swinging ends of said steering cranks, one of said steering cranks extending upwardly and one downwardly, operatively connected with the steering column, and placed at an angle to the rear of a vertical line through the axis of the steering shaft, whereby on the rotation of the steering column one link will move forwardly over a longer stroke causing the fore wheels to describe different concentric circles in steering, the outer wheel the larger and the inner wheel the smaller circle.

6. A duplex steering mechanism for auto cars comprising two stub-axles each one carrying a steering arm and a drag link supporting arm, these arms inclined to give the front wheels the proper direction on turning, the swinging end of the steering arms adapted to stand in the rear of the vertical plane bisecting the stub-axles, a drag-link connecting these drag-link supporting arms, a transverse steering shaft operatively connected with the steering column, a steering crank on each end of the steering shaft, one crank extending upwardly, and one downwardly, steering links extending forwardly from the steering cranks to the steering arms, the steering cranks mounted to meet the varying strokes of the steering arms.

7. A duplex steering-device comprising a pair of steering-arms, one on the spindle of each front wheel, a steering-shaft, steering-cranks secured thereon, steering-links operatively connected at their forward ends to the steering-arms, and at their rear ends to the swinging ends of the steering-cranks, the steering-arms and the steering-cranks one or both being inclined rearwardly, this inclination may be in one, it may be in both, the sum total of such inclination rearwardly being equal to the angle of the tie-rod supporting arms to the spindle.

8. In a steering-device, a steering-column, steering cranks actuated thereby, spindles carrying steering-arms and tie-rod supporting arms, the arms arranged at an angle to the spindles to give the steering-wheels the proper angle in turning, a tie-rod carried by the tie-rod supporting arms, the steering-arms or the steering-cranks or both arranged on their respective supports to meet the varying stroke of the tie-rod supporting-arms.

9. In a steering mechanism of the character herein described, a pair of spindles, wheels thereon, each spindle having a tie-rod-supporting arm and a steering arm, the former arms arranged at an angle to the spindle to give the wheels the proper angle in turning, and the latter arranged with the steering-cranks to meet said angle and coöperate therewith, a tie-rod connecting the tie-rod-supporting arms to keep the spindles in proper position while steering, means for carrying a pair of vertically swinging steering cranks, including a transverse steering shaft or shafts, a pair of cranks on said means, steering links connecting the swinging ends of the steering cranks with the swinging end of the steering arms, means to operate the steering cranks, the steering cranks and the steering arms positioned on their respective supports to maintain a constant distance between the swinging ends of the cranks and the swinging ends of the steering arms while being operated.

In witness that I claim the foregoing I have hereunto subscribed my name this 9th day of January, 1914.

HENRY T. HAZARD.

Witnesses:
BESS C. HOCKETT,
MARIE BATTEY.